United States Patent
Wenger et al.

(10) Patent No.: US 9,238,582 B2
(45) Date of Patent: Jan. 19, 2016

(54) ASSEMBLY COMPRISING J-AGGREGATES

(71) Applicant: CSEM Centre Suisse d'Electronique et de Microtechnique SA Recherche et Developpement, Neuchatel (CH)

(72) Inventors: Bernard Wenger, Chaumont (CH); Emmanuel Scolan, Neuchatel (CH); Raphael Pugin, Auvernier (CH); Rolf Steiger, Le Mouret (CH)

(73) Assignee: CSEM CENTRE SUISSE D'ELECTRONIQUE ET DE MICROTECHNIQUE SA—RECHERCHE ET DEVELOPMENT, Neuchatel (CH)

( * ) Notice: Subject to any disclaimer, the term of this patent is extended or adjusted under 35 U.S.C. 154(b) by 207 days.

(21) Appl. No.: 13/941,578

(22) Filed: Jul. 15, 2013

(65) Prior Publication Data
US 2014/0017485 A1    Jan. 16, 2014

(30) Foreign Application Priority Data
Jul. 13, 2012 (EP) .................................. 12176306

(51) Int. Cl.
B82B 1/00 (2006.01)
B82B 3/00 (2006.01)
(Continued)

(52) U.S. Cl.
CPC ............... *B82B 1/001* (2013.01); *B82B 3/0014* (2013.01); *B82B 3/0052* (2013.01); *B82Y 15/00* (2013.01); *B82Y 30/00* (2013.01); *B82B 3/0085* (2013.01); *B82Y 20/00* (2013.01); *Y10S 977/774* (2013.01); *Y10S 977/932* (2013.01); *Y10T 428/24997* (2015.04); *Y10T 428/249986* (2015.04); *Y10T 428/249994* (2015.04); *Y10T 428/256* (2015.01)

(58) Field of Classification Search
CPC ............ Y10T 428/249994; Y10T 428/24802; B82Y 20/00; B82Y 30/00; Y10S 977/774; Y10S 977/932
See application file for complete search history.

(56) References Cited

U.S. PATENT DOCUMENTS

| 7,799,422 B2 | 9/2010 | Tischler et al. |
| 7,824,617 B2 | 11/2010 | Steiger et al. |
| 2007/0196596 A1 | 8/2007 | Beer et al. |

FOREIGN PATENT DOCUMENTS

| EP | 1788936 A2 | 5/2007 |
| EP | 2028236 A1 | 2/2009 |

(Continued)

OTHER PUBLICATIONS

Agranovich et al., "Resonant Energy Transfer from Organics to Quantum Dots and Carrier Multiplication", PACS Nos. 71.35.Aa, 71.35.Gg, 78.67.Pt, 78.90+t, arXiv preprint, ArXiv:0801.3794, 2008, pp. 1-4.

(Continued)

*Primary Examiner* — Gerard Higgins
(74) *Attorney, Agent, or Firm* — Young & Thompson (57) ABSTRACT

The assembly is made up of: a) a support including a mesoporous coating whose pores have an average diameter dimensioned so as to enable molecules from the family of cyanines to penetrate them, and b) a layer of molecules from the family of cyanines and organized into J-aggregates within the pores of the coating. The assembly moreover includes Quantum Dots located within the same pores as those containing the J-aggregates, the Quantum Dots maintaining J-aggregates structure. A method for producing such an assembly is also described.

20 Claims, 8 Drawing Sheets

(51) Int. Cl.
  *B82Y 15/00*  (2011.01)
  *B82Y 30/00*  (2011.01)
  *B82Y 20/00*  (2011.01)

(56) References Cited

FOREIGN PATENT DOCUMENTS

| WO | 2006020920 A2 | 2/2006 |
|---|---|---|
| WO | 2009026105 A1 | 2/2009 |
| WO | 2011146299 A2 | 11/2011 |

OTHER PUBLICATIONS

Barbara et al., "Contemporary Issues in Eletron Transfer Research", J. Phys. Chem., 1996, vol. 100, No. 31, pp. 13149-13168.

Borisenko et al., "Physics, Chemistry and Applications of Nanostructures", Proceedings of International Conference Nanomeeting—2011, pp. 173-176, XP9166744.

Heier et al., "Fast Assembly of Cyanine Dyes into Aggregates onto [6,6]-Phenyl C61-Butyric Acid Methyl Ester Surfaces from Organic Solvents", Langmuir Article, American Chemical Society, pp. A-G.

Heier et al., "Template synthesis of cyanine dye H-aggregates on nanostructured [6,6]-phenyl C61-butyric acid methyl ester substrates", Phys. Chem. Chem. Phys., 2011.

Steiger et al., "Physical-Chemical Properties of Organized Sensitizer Molecules", Journal of Imaging Science, 1988, vol. 32, pp. 64-81.

Kuhn et al., "Chromophore Coupling Effects", in a book entitled "J-aggregates" by T. Kobayashi, ISBN 981-02-2737-X, pp. 1-40.

Nuesch et al., "Merocyanine Aggregation in Mesoporous Networks", J. Am. Chem. Soc., 1996, vol. 118, No. 23, pp. 5420-5431.

Popa et al., "Fabrication of nanopore arrays and ultrathin silicon nitride membranes by block-copolymer-assisted lithography", Nanotechnology, 2009, vol. 20, pp. 1-11.

Savateeva et al., "Excitation Energy Transfer from Semiconductor Quantum Dots to Cyanine J-Aggreates", Physics, Chemistry and Application of Nanostructures, 2011, pp. 173-176.

Savateeva et al., "Hybrid organic/inorganic semiconductor nanostructures with highly efficient energy transfer", Journal of Materials Chemistry, 2012, pp. 2-6.

Shu-Pian et al., "Resonant Energy Transfer from Organics to Quantum Dots and Carrier Multiplication", IEEE, 2009, XP31455214.

Walker et al., "Quantum Dot/J-Aggregate Blended Films for Light Harvesting and Energy Transfer", Nano Letters, 2010, vol. 10, pp. 3995-3999.

Walker et al., "Narrow-Band Absorption-Enhanced Quantum Dot/J-Aggregate Conjugates", J. Am. Chem. Soc., 2009, vol. 131, No. 28, pp. 9624-9625.

Walker et al., "Color-Selective Photocurrent Enhacement in Coupled J-Aggregate/Nanowires Formed in Solution", Nano Letters, 2011, pp. A-E.

Pugin et al., "Surface Nanopatterning by Polymer Self-Assembly: from Applied Research to Industrial Applications", Journal of Photopolymer Science and Technology, 2009, vol. 22, No. 2, pp. 223-228.

Walheim et al., "Nanophase-Separated Polymer Films as High-Performance Antireflection Coatings", Science, 1999, vol. 283, pp. 520-522.

Walker et al., "Quantum Dot/J-aggregate blended films for light harvesting and energy transfer: Supporting Information", 2010, pp. 1-10.

Sturmer, David, "Syntheses and Properties of Cyanine and Related Dyes", Chapter VII, Research Laboratories, Eastman Kodak Company, Rochester, New York, pp. 441-601.

| Metal oxide matrix | Surface charge (acoustophoresis) | Agglomerate diameter (elementary nanoparticle diameter) (nm) | Pore volume (mL/g) | Mean pore diameter (nm) |
|---|---|---|---|---|
| AlOOH Type 1 | +34 mV (pH = 4.0) | 25 (14) thick rods | 0.7 | 20 |
| AlOOH Type 2 | +26 mV (pH = 4.8) | 15 (7) sticks | 0.6 | 10 |
| SiO₂ | +33 mV (pH = 5.1) | 45 (10) spheres | 1.4 | 30 |

ASSEMBLY COMPRISING J-AGGREGATES

TECHNICAL FIELD

The present invention relates to the field of nanotechnology. More specifically, it concerns an assembly made up of:
a support comprising a mesoporous coating whereof the pores have an average diameter dimensioned so as to enable molecules from the family of cyanines to penetrate them, and
a layer of molecules from the family of cyanines and organized into J-aggregates within the pores of the coating.

J-aggregates are self-arrangements of cyanine molecules which form very ordered assemblies whereof the organizations are of the crystalline type. A description of J-aggregates and their properties can be found in the article by H. Kuhn et al. in a book entitled "J-aggregates" by T. Kobayashi, ISBN 981-02-2737-X. Due to the nearly flawless organization of J-aggregates, they have remarkable properties. Mainly, the electro-optical properties of J-aggregates result from exceptional interactions between the transition dipole moments of the dyes, creating extended exciton states after exposure to light. Characteristics for J-aggregates are a narrow excitonic absorption band and resonance fluorescence. Connected to that are many other exceptional properties of J-aggregates, such as super-radiant emission, high non-linear susceptibilities, efficient energy migration and superquenching. Applications in sensing, light harvesting, light-emitting diodes and non-linear optics can all greatly benefit from the unique properties of J-aggregates. Device driven research on J-aggregates is further highly motivated by the fact that a counterpart on the side of inorganic semiconductors does not exist.

A first issue regarding this technology, was to make J-aggregates layer in a simple and efficient way, suitable to extensive production. Decisive methods have been described in EP1788036 and EP2028236 in the name of the applicant and incorporated by reference to the present document.

Promoting energy transfer through J-aggregates is the object of the present invention. Actually, an exciton spread in a J-aggregates can be caught by a suitable energy acceptor having a spectral overlap between its absorption spectrum and the emission spectrum of the J-aggregates. The energy acceptor should be arranged in the vicinity of the J-aggregates.

Suitable energy acceptors for excited J-aggregates can be dye molecules, semiconductor or metal based nanoparticles. In a preferred application, colloidal semiconductor quantum dots (QD) can be used as energy acceptors. One can also consider the opposite situation where the QD is used as donor and J-aggregates as acceptor.

A quantum dot is a portion of matter (in general semiconductor based) whose excitons are confined in all three spatial dimensions. Consequently, such materials have electronic properties intermediate between those of bulk semiconductors and those of discrete molecules. Nanoparticles made of metals may also be labelled quantum dots if they are small enough (typically sub 10 nm) so that quantization of electronic energy levels occurs. Some experiments known in the art have shown that metal based nanoparticles present such properties and one can expect that transition metals may also present such QD properties. In addition, a new type of cadmium free quantum dots made from rare earth doped oxide materials and showing bright emissions and similar optical properties to those of other semiconducting quantum dots have been developed because of legislation restricting the use of heavy metals (typically Cd, Hg, Pb). Thus, in the present invention, the term QD will include semi-conducting QD, metal based particles the dimension of which enabling them to present QD properties, and rare earth doped oxide based nanoparticles. As non-limiting example, one can cite the following commercially available semi-conducting species: semi-conductor based QD will include CdS, CdSe, ZnS, CdTe, InAs, InP, CdSeS, ZnO, Ag halides and mixed systems containing one or several of these semiconductors. Metal based QD will include Cu, Ag, Au, Ni, Pd, Pt, Co, Cr, Ru, Fe. Oxide based QD will preferably include BaTiO3 and YVO4 doped with rare earth elements.

STATE OF THE ART

In various papers by Bulovic et al. (publ. 2009 (J-aggregates only in water), 2010 (J-aggregates also in films) and 2011 (J-aggregates in films), WO2009026105 and WO2011146299 patent applications, energy transfer processes between J-aggregates and quantum dots are described in detail.

It should be understood that the distance between J-aggregates and quantum dots is an important criterion to obtain an energy transfer between these species. Typically, this distance should be comprised between 0.1 and 10 nm. Correct distances for energy transfer have been adjusted by the Langmuir-Blodgett (LB) technique (J. Imaging Sci. 1988, 32(2), 64). A patent by Tischler et al. (U.S. Pat. No. 7,799,422, 2006), Walker et al. (Nano Letters 2010, 10(10), 3995) and Agranovich et al. (arXiv preprint, ArXiv:0801.3794, 2008) show that optimum distances for energy transfer between J-aggregates and semiconductor QD can be adjusted using layer-by-layer deposition (LBL) instead of LB-layers. Both methods of distance adjustment, LB and LBL, are not feasible for industrial manufacturing of devices containing highly perfect J-aggregates.

In document WO2009026105, Bulovic et al. propose a new method to adjust the distance between J-aggregates and quantum dots by electrostatic interactions, i.e. by electrostatic conjugation of cyanine J-aggregates at the surface of a quantum dot after ligand exchange reaction. After deposition of this molecular construct, the resulting quantum dot/J-aggregate films exhibit energy transfer from J-aggregates to quantum dots. In this case the relatively high efficiency of this energy transfer is explained by the close conjugation of quantum dots and coherently coupled dyes in contrast to previous work where the energy transfer efficiency was limited by using polyelectrolyte layers separating the donors and acceptors. Another method to adjust the distance between J-aggregates and quantum dots by electrostatic interactions has been described by Savateeva et al. (Physics, Chemistry, and Applications of nanostructures, 2011, 173; J. Mater. Chem. 2012, 22, 10816) without having to synthesize constructs between cyanine monomers and QD in aqueous solutions. Films containing these QD-J-aggregates hybrid systems were not described.

Such methods present several drawbacks. It can only be achieved by relatively complex synthesis of "QD J-aggregates constructs". Films can only be manufactured for down conversion, i.e. by exciting J-aggregates and emitting in QD.

The present invention aims to propose a new method making it possible to obtain rather simply energy transfer between J-aggregates and energy donors or acceptors.

DISCLOSURE OF THE INVENTION

More particularly, the invention concerns an assembly made up of a support comprising a mesoporous coating whereof the pores have an average diameter dimensioned so as to enable molecules from the family of cyanines to diffuse into the mesoporous coating and to penetrate into the pores, molecules from the family of cyanines and organized into J-aggregates at least within the pores of the mesoporous coating.

According to the invention, said assembly moreover comprises Quantum Dots (QD) located within the same pores as those containing the J-aggregates, said QD maintaining J-aggregates structure.

Advantageously, QD are chosen so as to be able to act as energy acceptors or donors for the J-aggregates.

Advantageously, QD are chosen so as to be able to act as electron acceptors or donors.

In a preferred embodiment, said pores have an average diameter dimensioned so as to enable macromolecules with dendritic architecture to penetrate them. The assembly is also made up of such macromolecules forming a functionalized layer at least in said pores and said layer of molecules from the family of cyanines interact with the macromolecules with dendritic architecture to form J-aggregates.

BRIEF DESCRIPTION OF THE DRAWINGS

The invention will be better understood upon reading the description which follows, done in reference to the appended drawings in which:

FIG. 4 shows a table disclosing some possible metal oxides able to form the mesoporous substrate and some of their properties, FIG. 5 proposes spectra illustrating excitation of J-aggregates of Myline-1 as donors and energy transfer between J-aggregates and QD acceptors in a porous film, FIG. 6 (emission spectra) demonstrates the stability of QD in an assembly made up according to a preferred embodiment of the invention, FIGS. 7a, 7b and 7c (emission and excitation spectra) illustrate a case where a QD with emission near 540 nm was excited at 375 nm and energy transfer occurred to J-aggregates of Myline-2 used as energy acceptors in films.

DETAILED DESCRIPTION

One example of a method for producing a particular J-aggregate/Quantum Dot (QD) device will be described in detail below as a non-limiting illustration of the invention.

As one will understand, the method essentially consists of preparing near room temperature a nanoparticular metal-oxide coating on a substrate chosen among organic, metallic or ceramic substrates so as to form a mesoporous coating. The dimensions of the pores are typically ranged between 1 and 100 nm, preferably between 2 and 50 nm.

Then dendritic architecture molecules are adsorbed along the mesoporous coating walls including the mesopores walls of the metal-oxide coating and thus define a dendrimer support. Cyanine molecules are subsequently self-assembled into supramolecular J-aggregates on this dendrimer support at least within the pores. Commercially available QD are then incorporated into the pores containing the J-aggregates from aqueous solutions. One or more QD can be introduced within one pore.

Even if such method is preferred, one can also consider forming J-aggregates directly within pores of a mesoporous coating without any intermediate dendritic architecture based functionalized layer. As a non-limiting example, it has been demonstrated by Nüesch et al. (ref. J. Am. Chem. Soc. 1996, 118, 5420-5431) that hydroxylated and salt-impregnated mesoporous metal oxide films can be used for templating the aggregation processes. The authors have indeed described a method to form aggregates by controlling the texture of the porous films, their surface energy and the atmospheric conditions such as the presence of solvent or the humidity rate. This method can therefore be considered in this invention for the fabrication of mesoporous coating containing dye J-aggregates within their porous network, although J-aggregates obtained here are much less perfect and stable than by using macromolecules with dendritic architectures.

In addition, even if the methods described above have been demonstrated for mesoporous metal oxide coatings made from aqueous solutions, one can also consider forming J-aggregates within pores of a mesoporous organic matrix with, or without any intermediate dendritic architecture based functionalized layer. As a non-limiting example, Heier et al. (ref Langmuir, 2010, 26(6), 3955 and Phys. Chem. Chem. Phys. 2011, 13, 15714) recently described the synthesis of cyanine aggregates in nanostructured organic films fabricated by means of phase separation processes. Such methods as well as the use of mesoporous polymeric templates made by polymer demixing, block-copolymer phase separation or by replication as already described in the literature (ref. Popa et al. Nanotechnology 2009, 20, 485303; Walheim et al. Science, 1999, 283, 520; R. Pugin et al. Journal of Photopolymer Science and Technology, 2009, Vol. 22, 2, 223) can therefore be considered in this application for the fabrication of mesoporous organic coatings containing cyanine dye aggregates within their porous network.

Preparation of Nanoparticular Metal-Oxide Coatings Containing J-Aggregates

The preparation of mesoporous nanoparticular coatings with various metal oxides on a large variety of substrate and the subsequent functionalization with J-aggregates have been described in document EP2028236 hereby incorporated by reference. For $SiO_2$ coatings, one can refer to the application US2007196596 also incorporated by reference. It should be noticed that cyanines intended to form the J-aggregates diffuse into the mesoporous coating and penetrate into the mesopores.

One can use the different dyes defined in the article of D. M. Sturmer published in the book "Chemistry of heterocyclic compounds: special topics", Volume 30, pp 441-601, edited by A. Weissberger and B. W. Rossiter, 1977 (Wiley Interscience, New York), and including structure examples which are given respectively in FIGS. 2a and 2b, 3, 9, 10 and 14, of EP1788036 hereby incorporated by reference.

Figure 4:
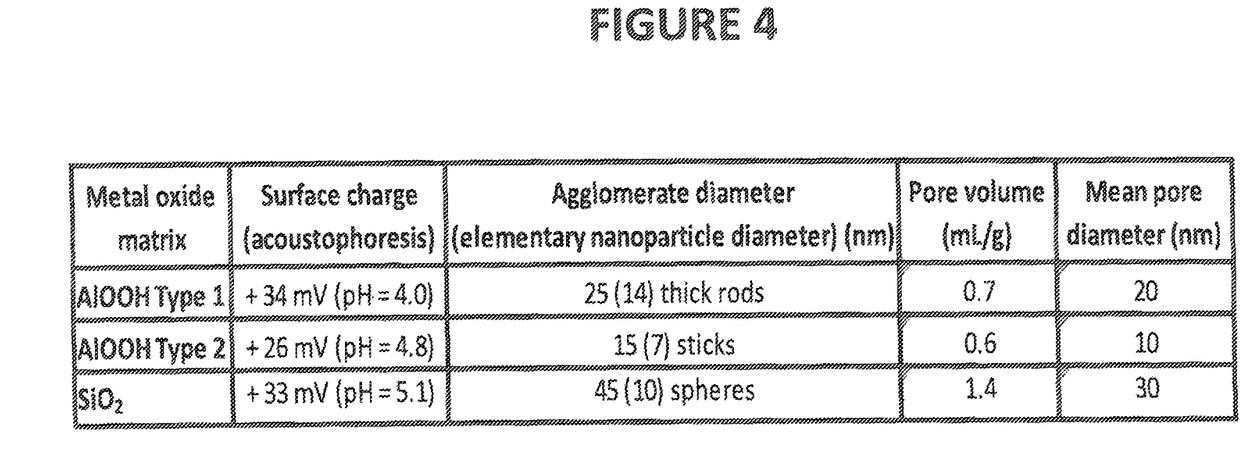

One can cite, as preferred cyanines to form J-aggregates [5,5'-diphenyl-dibenzoxazolo N, N'-propylsulfonate]-9 ethyl trimethine cyanine, called Myline 1 (Myl-1), and 5,5',6,6'-tetrachloro dibenzimidalolo 2,2'-butylsulfonate 9,9'-N-diethyl trimethine cyanine, called Myline 2 (Myl-2) (see structures in patent EP1788936 FIGS. 4 and 9 respectively). Myl-1 and Myl-2 were synthesized by ILFORD IMAGING Switzerland. More generally, cyanines, mero-cyanines, squaraines and their derivatives, are capable of self-assembly in order to form J-aggregates.

Preparation of Assembly with QD and J-Aggregates in Pores of Metal Oxide Nanoparticles Dried coatings containing the J-aggregates (as described above) were functionalized with an aqueous solution of commercially available QD, rinsed and dried before spectroscopic measurements. For instance, QD can be supplied by Cytodiagnostics, proposing core-shell structured colloidal QD, the semiconducting core being composed of different Cd or Zn sulphides and selenides, and the external shell made of a stabilising organic layer presenting different chemical groups (e.g. OH or $NH_2$, referred below as QD-OH and QD-$NH_2$ respectively). The total diameter is approximately 10 nm. Concentrations of QD solutions were varied between 1 to 25 mg per mL as shown in results proposed thereafter.

Figure 1:
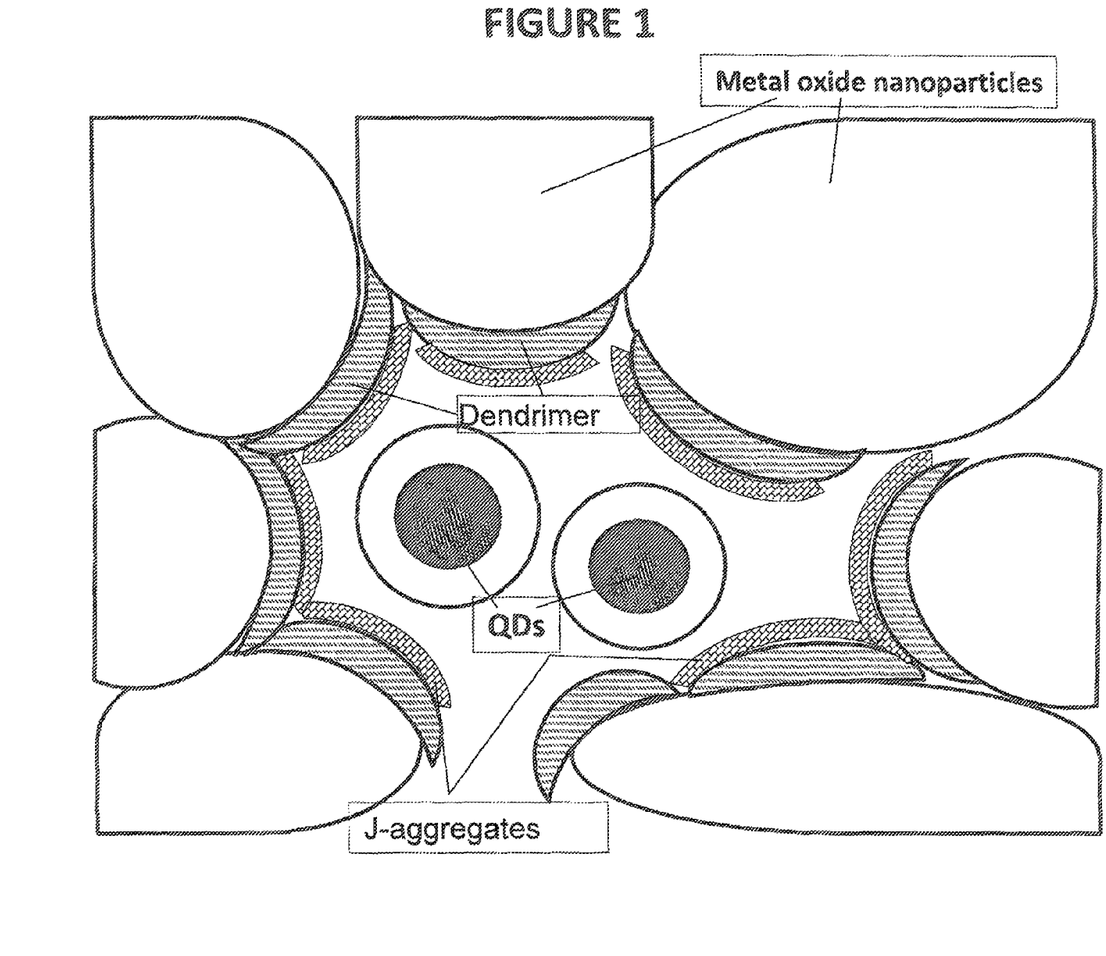
FIG. 1 represents schematically the configuration of an assembly made up according to a preferred embodiment of the invention, FIG. 2 proposes absorption spectra of J-aggregates with and without QD (FIG. 2a), and with QD after different duration of storage (FIG. 2b)

The configuration obtained is schematically illustrated in FIG. 1. In a pore of a mesoporous nanoparticular metal-oxide coating, macromolecules with dendritic architecture are adsorbed on the internal walls of the pores. Said pores have an average diameter dimensioned so as to enable macromolecules with dendritic architecture to penetrate them. The macromolecules with dendritic architecture form a functionalized layer at least in said pores.

Then, a layer of molecules from the family of cyanines interacting with the macromolecules with dendritic architecture is organized into J-aggregates within the pores of the metal oxide coating.

One or more QD may also be accommodated within the same pores as those containing the J-aggregates and, as it will be explained thereafter, may interact and undergo energy transfer with J-aggregates.

Stability of Assembly

It has been surprising to observe that QD did not affect the J-aggregate stability. FIG. 2 represents absorption spectra of J-aggregate of Myl-1. As previously described in application EP2028236, high quality J-aggregates are formed in the pores as proved by the sharp absorption peaks.

Figure 2A:
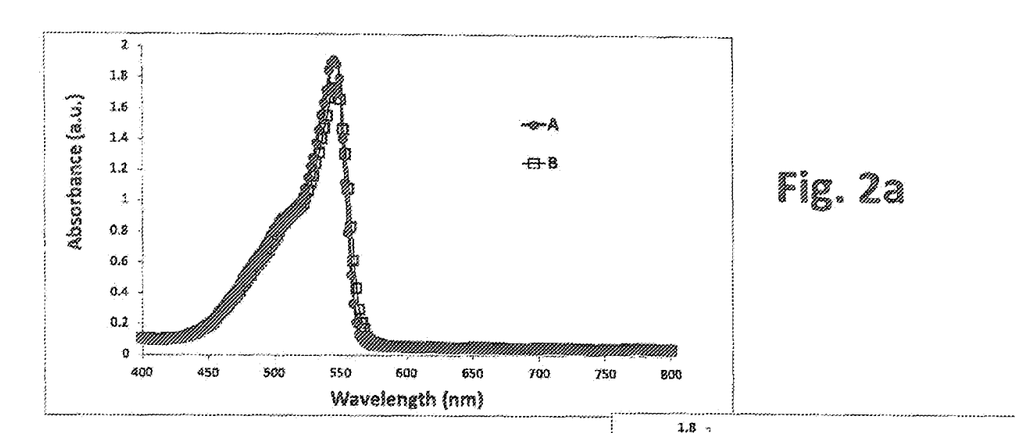
Figure 2B:
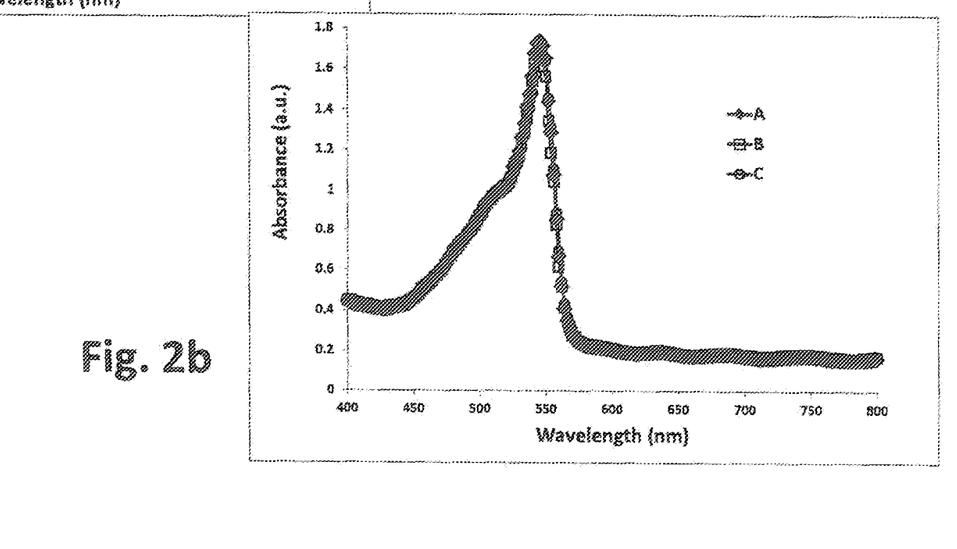

On FIG. 2a, one can compare absorption spectra with (B) and without QD (A). Said spectra are identical within experimental errors. On FIG. 2b one can compare absorption spectra containing J-aggregates of Myl-1 together with QD after storage in the absence of light during up to 22 days in air. FIGS. 2b (A, B, C) show Absorption spectra after 0, 6 and 22 days, respectively. This shows that the presence of the QD has no influence on the long-term stability of the J-aggregates.

Preparation of a Reference Assembly on a Planar Substrate (Glass)

As a reference to prove the advantages of mesoporous substrates, it has been proposed experiments on a planar substrate, where the vicinity of the species is limited and obtained by successive layer by layer depositions.

A monolayer of a highly perfect Myl-1 J-aggregate on a PAMAM G4 support deposited on a glass substrate has been prepared. One can refer to EP1788036 for experimental details about this preparation. After rinsing and drying, a 5 times diluted commercial aqueous QD solution is applied by spin-coating onto the dried J-aggregate layer. Spectral measurements shown in FIG. 3 were carried out after rinsing and drying.

Figure 3A:
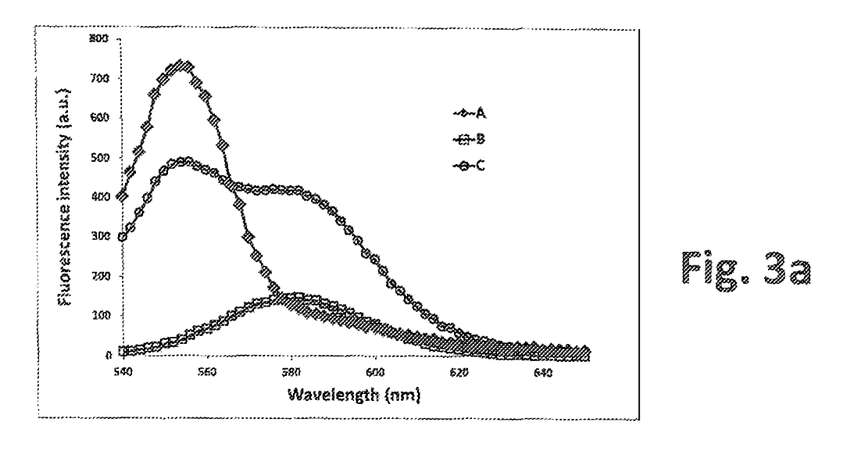
FIGS. 3a and 3b illustrate energy transfer between J-aggregates and QD on a reference glass substrate by using the J-aggregate as a donor and the QD as acceptors.
Figure 3B:
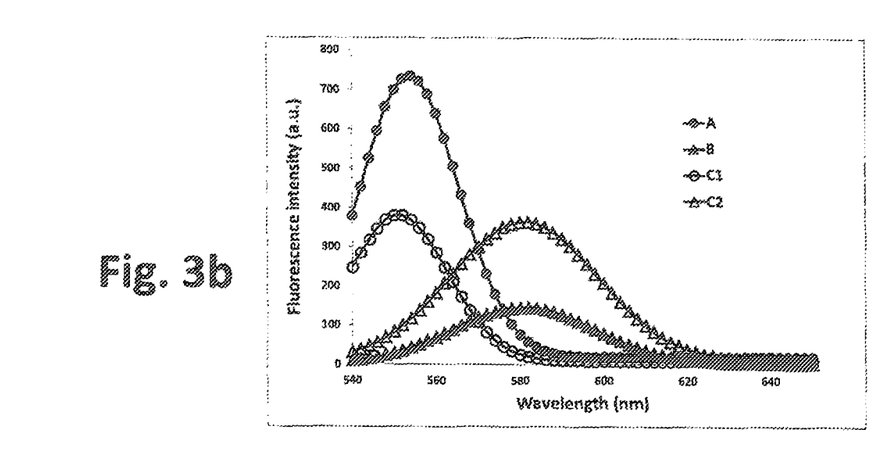

On the emission spectra of FIG. 3a are represented, for an excitation at 510 nm, a spectrum A for Myl-1 J-aggregates on a glass substrate, a spectrum B for QD diluted 5 times on a glass substrate, a spectrum C for Myl-1 J-aggregates and QD diluted 5 times on a glass substrate. In order to remove spectral influences of remaining monomers and dimers of the cyanine, these spectra are filtered by deconvolution in FIG. 3b, where spectra B and A are for QD alone and J-aggregates of Myl-1 alone, respectively. Spectrum C1 shows the partial quenching of Myl-1 J-aggregates by the presence of QD, and spectrum C2 shows enhanced emission of the QD after energy transfer. Results obtained are 50% J-aggregate fluorescence quenching and enhancement of the QD signal by a factor of 2.5, to be compared to 100% J-aggregate fluorescence quenching and enhancement of the QD signal by a factor of 2.5 in Bulovic's method cited in prior art.

Such experiments demonstrate that energy transfer may occur between commercially available QD and J-aggregates, even if the enhancement obtained here is only similar to that obtained by Bulovic's method.

Experiments on Mesoporous Substrates

Above proposed experiments have been extended to mesoporous substrates in order to evaluate the potential influence of confinement on energy transfer efficiency between QD and J-aggregates.

Different parameters have been tested. FIG. 4 represents several materials used to form the mesoporous substrate. The table indicates the shape and the diameter of agglomerated particles and in parenthesis, the diameter of elementary particles. AlOOH Types 1 and 2 were purchased from SASOL Ltd. $SiO_2$ was purchased from CABOT Ltd. The table also indicates the volume and mean diameter of pores measured with the nitrogen adsorption method. Materials should be chosen so as to enable molecules from the family of cyanines intended to form the J-aggregates and QD to penetrate them. As taught by EP2028236, mesoporous coatings can be realized in a material chosen among AlOOH, $TiO_2$, ITO, $SiO_2$, $\gamma$-$Al_2O_3$, $ZrO_2$, $SnO_2$, ZnO, $Ta_2O_5$, mixture of them or with a base of doped conductor oxide nanoparticles. The mesoporous coatings can also be made of organic matrix, as described in references mentioned in paragraph [0021] above.

The mean diameter of pores of the mesoporous layer should be large enough to enable encapsulation of the selected QD. QD are inserted into the pores of the mesoporous substrate by using similar methods as those proposed for glass substrate.

The addition of the QD within the mesoporous coating should not lead to a modification of the absorption spectrum of the J-aggregates that would result from the disassembling of the J-aggregates. QD should also not be destabilized (i.e. not aggregated) by J-aggregates or by the chemical compounds present in the assembly according to the invention. It should also present an overlap between the emission spectrum of the donor with the absorption spectrum of the acceptor to make the energy transfer possible.

One can also consider having electron/hole transfer that would require an overlap of the electronic states (between donor and acceptor) that enables electron transfer. As a matter of comparison with energy transfer, it is well known that the distance between the QD and the donor/acceptor for electron transfer should be much shorter, typically below 2 nm (see for example Barbara et al., J. Phys. Chem., 1996, 100, 13148-13168).

If a functionalized layer of macromolecules of dendritic architecture is used so as to contribute to the J-aggregate formation, one will refer to the documents EP1788036 and EP2028236 to obtain information regarding suitable dendrimers. Experiments have been conducted with PAMAM G4. However, even if this solution may be preferred because it offers a very efficient and cost effective solution to obtain J-aggregates within pores, one could consider methods obtaining such J-aggregates without any intermediate dendrimer layer, as mentioned above.

Results

Figure 5:
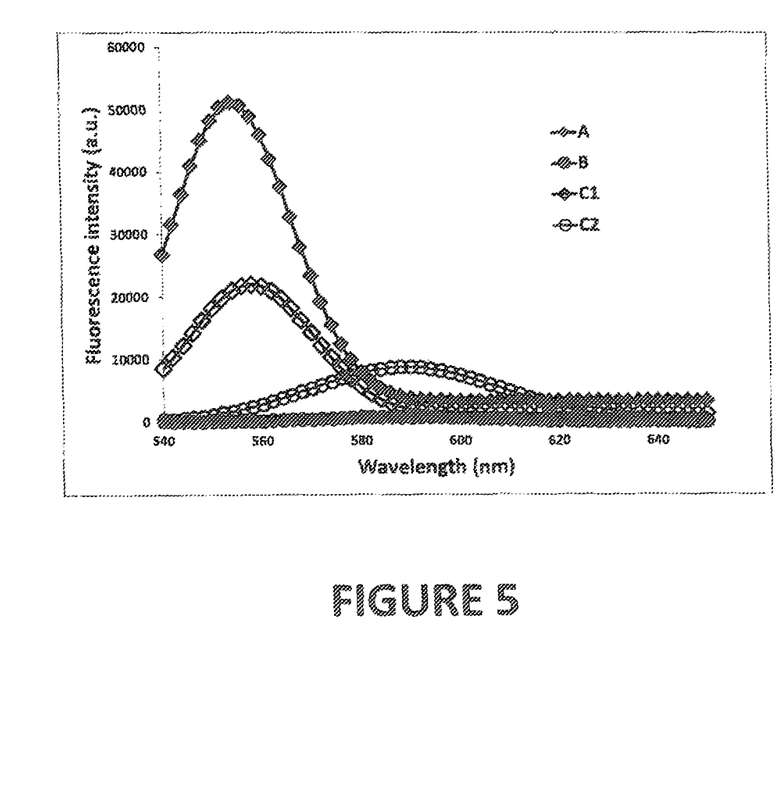
Figure 6:
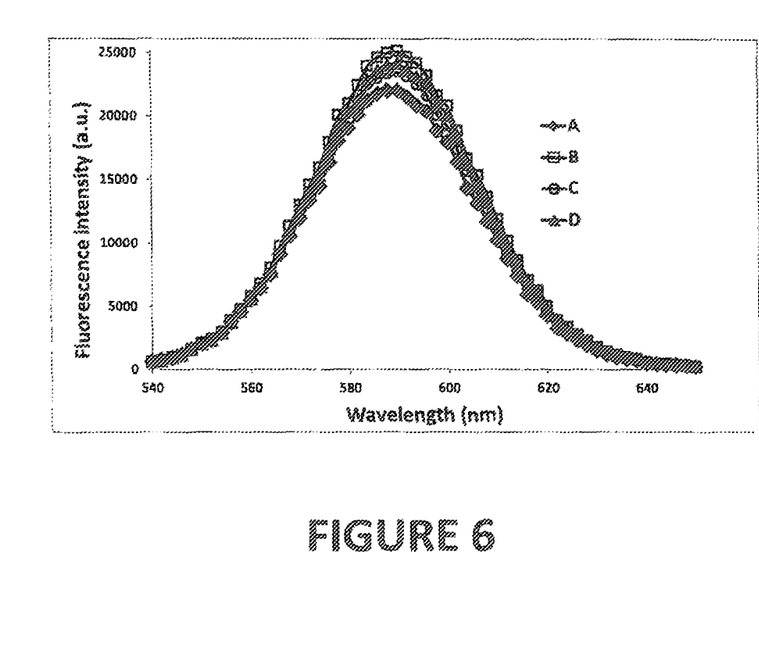

One will now refer to FIGS. 5-7 and to the table hereafter. FIG. 5 shows the emission spectra of Myl-1 after deconvolution with and without commercial QD solutions diluted 30 times on $SiO_2$. Spectrum A represents fluorescence intensity of J-aggregate alone in $SiO_2$ mesoporous coatings. Spectrum B represents the fluorescence intensity of the QD alone (diluted 30 times in water) in $SiO_2$ mesoporous coatings. Spectrum C1 represents the fluorescence intensity of the J-aggregate in presence of the QD (diluted 30 times in water) in $SiO_2$ mesoporous coatings. Spectrum C2 represents the fluorescence intensity of QD diluted 30 times in water in presence of the J-aggregate in $SiO_2$ mesoporous coating. One obtains 58% quenching of the intensity of the J-aggregate emission peak (spectrum C1) and an enhancement of 9 times of the intensity of the QD fluorescence peak (spectrum C2). This illustrates down-conversion and energy transfer between QD as acceptor and J-aggregate as donor.

The following table illustrates different results obtained with different cyanines and QD for down conversion using the J-aggregates as donors and the QD as acceptors after deconvolution. In all cases, emission as well as excitation spectra confirmed the energy transfer.

transfer. Such effects lead to enhancement losses of QD emission after energy transfer. QD should also be diluted enough to avoid clustering effects within the pores.

It should also be noted that light stability of J-aggregates in presence of QD within a same mesopore is much higher (min. by a factor of 100) for Myl-1 J-aggregates, than without QD. This also proves energy transfer between J-aggregates and QD occurs and increases the stability of the J-aggregates.

FIG. 6 shows emission spectra for QD (emission near 590 nm) in $SiO_2$ (films) during storage in air and absence of actinic light near room temperature. FIGS. 6 A-D show spectra after 0, 2, 6 and 22 days respectively, showing that the fluorescence emission of the QD varies little and rather improves somewhat with storage time.

Figure 7A:
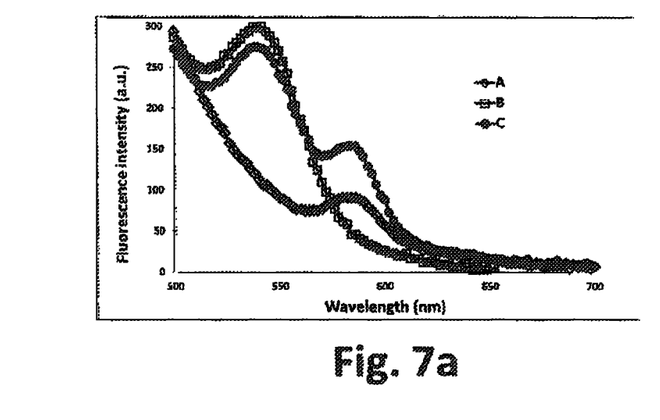
Figure 7B:
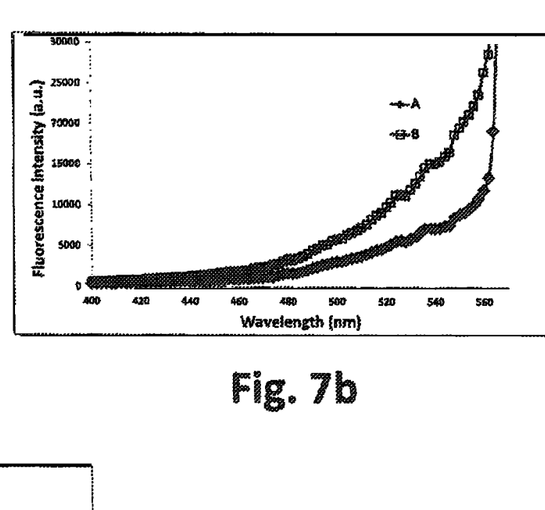

FIG. 7 demonstrates reverse energy transfer from an excited QD to the J-aggregate. The results are obtained by exciting QD and transferring energy to the J-aggregate of Myl-2. FIG. 7 shows that energy transfer is improved due to confinement in mesopores. FIG. 7a shows experimental emission spectra. Spectrum A displays the emission of the J-aggregate alone showing weak emission with a maximum near 590 nm (excitation at 375 nm). Spectrum B shows that the QD alone strongly emits near 550 nm, but very weakly near 590 nm. Comparison between spectrum C (QD and J-aggregate together) and spectrum A (J-aggregate alone)

| Metal oxide coating | QD type | Cyanine | Dilution rate of QD solution | QD/J-aggregate fluorescence intensity ratio | Quenching rate of J-aggregate fluorescence | Enhancement rate of QD fluorescence by energy transfer |
|---|---|---|---|---|---|---|
| $SiO_2$ | QD-OH | Myl-1 | 5 | 0.4 | 0.55 | 1 |
| $SiO_2$ | QD-OH | Myl-1 | 30 | 0.012 | 0.58 | 9 |
| $SiO_2$ | QD-$NH_2$ | Myl-1 | 30 | 0.001 | 0.60 | 20 |
| AlOOH Type 2 | QD-OH | Myl-1 | 1 | 0.18 | 0.43 | 1 |
| AlOOH Type 2 | QD-OH | Myl-1 | 5 | 0.3 | 0.50 | 1 |
| AlOOH Type 2 | QD-OH | Myl-1 | 30 | 0.0053 | 0.50 | 15 |
| AlOOH Type 1 | QD-OH | Myl-1 | 1 | 0.31 | 0.43 | 1 |
| AlOOH Type 1 | QD-OH | Myl-1 | 5 | 0.32 | 0.46 | 1 |
| AlOOH Type 1 | QD-OH | Myl-1 | 30 | 0.012 | 0.59 | 20 |
| Flat glass | QD-OH | Myl-1 | 5 | 0.17 | 0.50 | 2.5 |
| $SiO_2$ | QD-OH | Myl-2 | 30 | 0.04 | 0.41 | 6-7 |

One can observe that no enhancement is obtained for as received or only 5 times diluted QD solutions, while the J-aggregate fluorescence is always partially quenched. This can be explained by clustering effects of QD within the pores that inhibit energy transfer from QD to J-aggregates.

For more diluted QD solutions, one obtains enhancement comprised between 9 and 20 times for only 50% of fluorescence quenching of the J-aggregates, to be compared with 2.5 times for 50% on planar glass substrate and 2.5 times for 100% quenching by Bulovic.

According to the invention, extraordinary strong enhancement obtained with diluted QD in mesoporous coatings is due to confinement in pores that enables a "template effect" to have QD at an appropriate distance from the J-aggregates, and to very favourable arrangement of QD (no clustering) in these pores compared to planar substrates. Here, the QD alone contributes very little to emission.

In the smallest pores (AlOOH Type 2, 10 nm pore diameter), the enhancement is the highest. Here, QD alone fluoresces weakly as not many QD are present, but there is very little electron-hole recombination, as very few QD can be placed into such mesopores and therefore no clustering occurs.

Figure 7C:
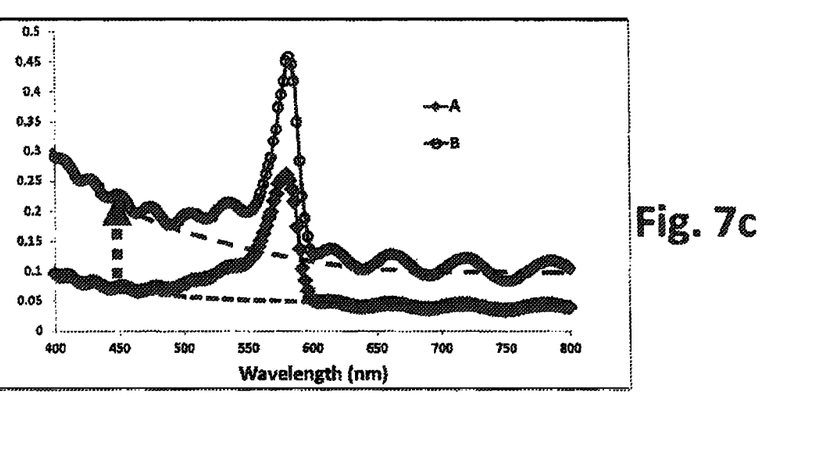
Figure 8:
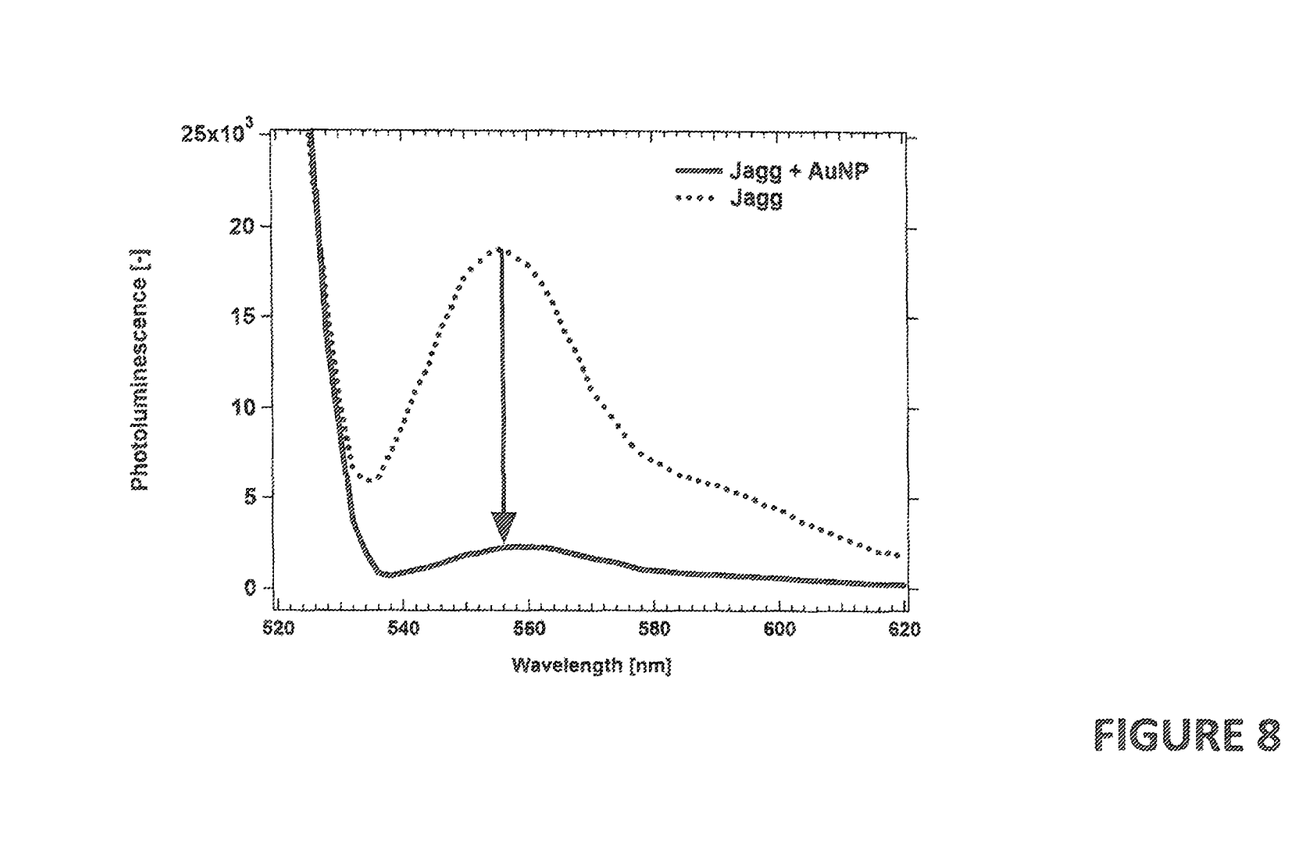
FIG. 8 illustrates the energy transfer from excited J-aggregates of Myl-1 to 5 nm Gold QD ($3.40 \cdot 10^{13}$ particles/mL) in mesoporous coatings of $SiO_2$.

Best results are obtained if the fluorescence intensity of the QD/J-aggregate is not too high (≤0.2), as otherwise we have recombination effects due to QD-clustering after energy demonstrates energy transfer from the QD to the J-aggregate. Here, J-aggregate emission near 590 nm increases by a factor of 2.5-3 (several experiments) due to energy transfer from the QD, while the emission of the QD near 550 nm is quenched by 14% due to energy transfer (B compared with C). Energy transfer is further illustrated in the excitation spectra of FIG. 7b (emission 590 nm), where the excitation spectrum B (J-aggregate and QD) vs. spectrum A (J-aggregate alone) show the contribution of the QD in the energy transfer process. Increase of the J-aggregate fluorescence emission when exciting in the range 460 to 550 nm is attributed to enhanced absorption of light by the QD. FIG. 7c shows absorption spectra of J-aggregate alone (Spectrum A) and J-aggregate+ QD (Spectrum B). The contribution of the QD to the absorption spectrum is a less decreasing curve approximated by the dashed line, while the absorption maximum and the FWHM of the J-aggregate remain unchanged. The efficiency of this process is improved in our films as compared to aqueous solutions (experiments Bulovic et al., cited above), where an enhancement factor of only 5 was observed for 100% fluorescence quenching of the QD instead of 3 but for only 14% quenching in our experiments.

It is therefore proposed a very efficient method enabling the control of the distance between QD and J-aggregates, so as to promote energy/electron transfers.

The forthcoming example describes the preparation of assembly with QD of gold and J-aggregates of Myl-1 in pores of metal oxide nanoparticle coatings ($SiO_2$ and AlOOH type 1, FIG. 4). Dried coatings containing the J-aggregate of Myl-1 were functionalized with a few drops of an aqueous solution of commercially available gold QD (concentration of 3.40 $10^{13}$ particles/mL in water) rinsed and dried before spectroscopic measurements. Gold QD were purchased from Sigma-Aldrich. QD-diameters of 5 nm were used. Gold nanoparticle concentrations in aqueous solutions were varied between 6.8 $10^{12}$ particles/mL and 6.8 $10^{13}$ particles/mL. The same quenching rate, in the range of 80% to 90%, was obtained.

One will now refer to the FIG. 8. It shows the emission spectra (excitation 510 nm) of the J-aggregate of Myl-1 with and without commercial gold-QD solutions on $SiO_2$. The dashed-line spectrum represents the fluorescence intensity of J-aggregate alone in $SiO_2$ mesoporous coatings. The solid-line spectrum represents the fluorescence intensity of the J-aggregate in presence of the gold-QD in $SiO_2$ mesoporous coatings. One obtains 80% quenching of the intensity of the J-aggregate emission peak, illustrating energy transfer from the excited J-aggregate Donor Myl-1 to the gold QD acceptor.

In the case where AlOOH type 1 coatings were used instead of $SiO_2$ coatings (FIG. 4), only 25% fluorescence quenching of the J-aggregate was measured instead of 80%. This is due to the smaller mesopore diameter (20 nm) in AlOOH instead of 30 nm in $SiO_2$, thus allowing the accommodation of a smaller amount of gold QD in a mesopore of AlOOH type 1 which decreases the efficiency of energy transfer. Absorption spectra (not shown here) of $SiO_2$-coatings with Au-QD alone and Au-QD+J-aggregates have revealed that both partners are present in $SiO_2$ coatings. The presence of Au-QD does not affect J-aggregate spectra, as their absorbance (maximum near 526 nm) is much lower than that of the J-aggregates.

One can also consider inserting in the pores of the mesoporous substrate some other species (organic molecules like dyes) which, thanks to the confinement provided by the pore dimensions, may be able to act as energy or electron donors/acceptors for the J-aggregates located in the same pore.

What is claimed is:

1. An assembly comprising a support; and a mesoporous coating on the support, wherein the mesoporous coating comprises pores, wherein cyanine molecules are organized into J-aggregates at least within the pores of the mesoporous coating, wherein the pores have an average diameter that enabled the cyanine molecules to diffuse into the mesoporous coating; and wherein said assembly moreover comprises Quantum Dots located within the same pores as those containing the J-aggregates, the structure of said J-aggregates being maintained in the presence of said Quantum Dots.

2. The assembly of claim 1, wherein said Quantum Dots and said pores are sized so as to provide a confinement of the Quantum Dots within said pores, said confinement enabling a transfer between Quantum Dots and J-aggregates, distance between J-aggregates and quantum dots is between 0.1 nm and 10 nm.

3. The assembly of claim 1, further comprising macromolecules with dendritic architecture forming a functionalized layer at least in said pores, wherein said pores have an average diameter that enabled the macromolecules with dendritic architecture to diffuse into the mesoporous coating, and wherein said cyanine molecules interact with the macromolecules with dendritic architecture to form said J-aggregates.

4. The assembly of claim 2, further comprising macromolecules with dendritic architecture forming a functionalized layer at least in said pores, wherein said pores have an average diameter that enabled the macromolecules with dendritic architecture to diffuse into the mesoporous coating, and wherein said cyanine molecules interact with the macromolecules with dendritic architecture to form said J-aggregates.

5. The assembly according to claim 1, wherein said Quantum Dots are chosen so to act as energy acceptors or donors for the J-aggregates.

6. The assembly according to claim 5, wherein said Quantum Dots and the J-aggregates present an overlap between the emission spectrum of the donor with the absorption spectrum of the acceptor to enable energy transfer.

7. The assembly according to claim 2, wherein said Quantum Dots are chosen so to act as energy acceptors or donors for the J-aggregates.

8. The assembly according to claim 7, wherein said Quantum Dots and the J-aggregates present an overlap between the emission spectrum of the donor with the absorption spectrum of the acceptor to enable energy transfer.

9. The assembly according to claim 1, wherein said Quantum Dots are chosen so as to act as electron acceptors or donors for the J-aggregates.

10. The assembly according to claim 2, wherein said Quantum Dots are chosen so as to act as electron acceptors or donors for the J-aggregates.

11. The assembly according to claim 1, wherein each of said Quantum Dots measures less than 15 nm in at least in one dimension of space.

12. The assembly according to claim 1, wherein said Quantum Dots are selected from the group consisting of semi-conducting nanoparticles, metallic nanoparticles, and rare earth doped oxide nanoparticles;

wherein the semi-conducting nanoparticles are selected from the group consisting of CdS, CdSe, ZnS, CdTe, InAs, InP, CdSeS, ZnO, Ag halides and mixed systems containing a combination of the preceding semi-conducting nanoparticles;

wherein the metallic nanoparticles are selected from the group consisting of Cu, Ag, Au, Ni, Pd, Pt, Co, Cr, Ru, and Fe; and wherein the rare earth doped oxide nanoparticles are selected from the group consisting of $BaTiO_3$ doped with a rare earth element and $YVO_4$ doped with a rare earth element.

13. The assembly according to claim 3, wherein each of said macromolecules with dendritic architecture is a dendrimer molecule.

14. The assembly according to claim 1, wherein said mesoporous coating comprises a mesoporous metal oxide coating.

15. The assembly of claim 14, wherein said mesoporous coating is a material selected from the group consisting of AlOOH, $TiO_2$, ITO, $SiO_2$, $\gamma$-$Al_2O_3$, $ZrO_2$, $SnO_2$, ZnO, $Ta_2O_5$, a mixture thereof of the preceding materials, and conductive doped oxide nanoparticles.

16. The assembly according to claim 1, wherein the average diameter of the pores of the mesoporous coating is between 1 and 100 nm.

17. A method for producing an assembly according to claim 1, comprising the following steps:

obtaining a support having thereon a mesoporous coating comprising pores, wherein the pores have an average diameter dimensioned so as to enable cyanine molecules and Quantum Dots to penetrate the pores;

forming a layer of J-aggregates of cyanines molecules within the pores of the mesoporous coating; and introducing Quantum Dots within the same pores as those containing the J-aggregates, wherein the structure of the J-aggregates is maintained in the presence of said Quantum Dots.

18. The method of claim 17, further comprising the step of:

depositing a solution of macromolecules with dendritic architecture on the mesoporous coating prior to forming the layer of J-aggregates, wherein the macromolecules with dendritic architecture penetrate inside the pores of the mesoporous coating and form a functionalized layer in the pores, the pores having an average diameter dimensioned that enabled macromolecules with dendritic architecture to penetrate them, and wherein the layer of J-aggregates is formed on the layer of said macromolecules with dendritic architecture.

19. The method of claim 17, wherein the Quantum Dots are introduced into the pores in a dilute solution that avoids clustering of the Quantum Dots within the pores.

20. The method of claim 18, wherein Quantum Dots are introduced into the pores in a dilute solution that avoids clustering of the Quantum Dots within the pores.

* * * * *